(12) United States Patent
Sato et al.

(10) Patent No.: US 8,170,760 B2
(45) Date of Patent: May 1, 2012

(54) VEHICLE DRIVING APPARATUS

(75) Inventors: Hiroshi Sato, Susono (JP); Osamu Komeda, Mishima (JP); Sachio Toyora, Numazu (JP); Mitsuhiro Tabata, Sunto-gun (JP); Koji Murakami, Susono (JP); Junichi Morimura, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 12/746,437

(22) PCT Filed: Mar. 23, 2009

(86) PCT No.: PCT/JP2009/055625
§ 371 (c)(1),
(2), (4) Date: Jun. 4, 2010

(87) PCT Pub. No.: WO2010/109573
PCT Pub. Date: Sep. 30, 2010

(65) Prior Publication Data
US 2011/0054745 A1    Mar. 3, 2011

(51) Int. Cl.
*G06F 19/00* (2011.01)
(52) U.S. Cl. ........................................ 701/54
(58) Field of Classification Search ............... 701/22, 701/51, 54, 67; 74/329–331, 356; 180/65.27; 903/902
See application file for complete search history.

(56) References Cited

U.S. PATENT DOCUMENTS

| | | | |
|---|---|---|---|
| 2002/0033059 A1 | 3/2002 | Pels et al. | |
| 2002/0088290 A1 | 7/2002 | Bowen | |
| 2006/0230855 A1 | 10/2006 | Leibbrandt et al. | |
| 2007/0204709 A1 | 9/2007 | Mesiti et al. | |
| 2007/0266810 A1* | 11/2007 | Forsyth | 74/331 |
| 2009/0082156 A1* | 3/2009 | Senoo | 475/159 |

FOREIGN PATENT DOCUMENTS

| | | |
|---|---|---|
| JP | 2003 35360 | 2/2003 |
| JP | 2003 79005 | 3/2003 |
| JP | 2006 118590 | 5/2006 |
| JP | 2007 15679 | 1/2007 |

OTHER PUBLICATIONS

International Search Report issued Apr. 14, 2009 in PCT/JP09/55625 filed Mar. 23, 2009.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

A vehicle driving apparatus that can execute cranking of an internal combustion engine by transmitting a mechanical power from a rotor of a motor to an engine output shaft without executing an engaging/disengaging operation of a clutch. A driving apparatus of a hybrid vehicle includes a first speed change mechanism capable of receiving mechanical power from an engine output shaft by a first input shaft and transmitting the mechanical power to drive wheels, a second speed change mechanism capable of receiving the mechanical power from the engine output shaft and a rotor by a second input shaft engaged with the rotor and transmitting the mechanical power to the drive wheels, a first clutch capable of engaging the engine output shaft with the first input shaft, and a second clutch capable of engaging the engine output shaft with the second input shaft.

4 Claims, 2 Drawing Sheets

VEHICLE DRIVING APPARATUS

TECHNICAL FIELD

The present invention relates to a vehicle driving apparatus used to a vehicle that includes an internal combustion engine and a motor as prime movers and can change the speed of the mechanical power output from an engine output shaft of the internal combustion engine and a rotor of the motor by a speed change mechanism and transmit the mechanical power to drive wheels.

BACKGROUND ART

In vehicle transmissions, a transmission using a so-called dual-clutch transmission is recently known to eliminate the interruption of transmission of mechanical power when the speed of the mechanical power is changed. The dual-clutch transmission includes two speed change mechanisms, i.e., a first speed change mechanism composed of a first group of speed change stages and a second speed change mechanism composed of a second group of speed change stages that are speed change stages other than the first group of the speed change stages, and further includes a first clutch capable of engaging an input shaft of the first speed change mechanism (hereinafter, described as a first input shaft) with an output shaft of an internal combustion engine (hereinafter, described as an engine output shaft) and a second clutch capable of engaging an input shaft of the second speed change mechanism (hereinafter, described as a second input shaft) with the engine output shaft. Then, dual-clutch transmission shifts gears by alternately engaging the first and second clutches.

Further, in vehicles including an internal combustion engine (engine) and a motor generator (hereinafter, simply described as a "motor") as prime movers, a vehicle driving apparatus, in which a motor (a rotor of the motor) is coupled with at least one of a first input shaft and a second input shaft of a dual-clutch transmission, is proposed (refer to, for example, Patent Documents 1, 2).

Further, Patent Document 3 described below discloses a mechanical oil pump for generating hydraulic pressure by being operated by the rotation of a rotating shaft (rotor) of a motor coupled with an input shaft of a transmission and supplying the hydraulic pressure to a first clutch and a second clutch. Patent Document 3 discloses to secure hydraulic pressure necessary to an operation for switching an engaged state and a disengaged state of a clutch (hereinafter, described as an "engaging/disengaging operation") by driving a mechanical oil pump by a motor when an internal combustion engine is not operated (while the engine stops).

Further, Patent Document 4 described below discloses a driving apparatus (a transaxle) in which a motor generator is connected to first and second input shafts of a dual-clutch (double-clutch) transmission and proposes to configure the driving apparatus such that a first engine clutch is ordinarily placed in an engaged state. Patent Document 5 described below discloses a dual-clutch transmission in which a rotor of an electric motor is engaged with one of first and second input shafts. Patent Document 6 described below proposes to configure "a start clutch" disposed between an input shaft of an automatic transmission and an engine such that the start clutch is placed in an engaged state when external power does not act on the start clutch. Patent Document 7 described below proposes to configure a first friction clutch corresponding to a first input shaft of a dual-clutch transmission and a second friction clutch corresponding to a second input shaft of the dual-clutch transmission such that the first friction clutch is placed in a normally disengaged state as well as the second friction clutch is placed in a normally engaged state. Further, Patent Document 8 described below discloses a dual-clutch (twin-clutch) transmission in which a second driving apparatus (drive unit) is connected to a second input shaft.

Patent Document 1: Japanese Patent Application Laid-open No. 2003-79005
Patent Document 2: Japanese Patent Application Laid-open No. 2006-118590
Patent Document 3: Japanese Patent Application Laid-open No. 2007-15679
Patent Document 4: Specification of United States Patent Application Laid-open No. 2002/0088290
Patent Document 5: Specification of United States Patent Application Laid-open No. 2002/0033059
Patent Document 6: Japanese Patent Application Laid-open No. 2003-35360
Patent Document 7: Specification of United States Patent Application Laid-open No. 2006/0230855
Patent Document 8: Specification of United States Patent Application Laid-open No. 2007/0204709

DISCLOSURE OF INVENTION

Problems to be Solved by the Invention

Incidentally, in a vehicle driving apparatus, in which a rotor of a motor is coupled with a second input shaft of a dual-clutch transmission as in Patent Documents 1, 2, it is required to rotate an engine output shaft of an internal combustion engine by transmitting the mechanical power, which is output from the rotor to the second input shaft, to the engine output shaft through a second clutch, that is, to execute so-called cranking in order to start the internal combustion engine.

When the second clutch described above is operated by a hydraulic pressure actuator, it is necessary to previously supply hydraulic pressure to the actuator before cranking of the internal combustion engine starts to execute the engaging/disengaging operation of the clutch. However, while a hybrid vehicle, which includes an internal combustion engine and a motor as prime movers, is at rest (hereinafter, described as that a vehicle stops), since the motor is not operated, a rotor and a member engaging with the rotor do not rotate. Thus, when the technique of Patent Document 3 is applied, hydraulic pressure necessary to the engagement operation cannot be supplied to the second clutch by driving a mechanical oil pump before the internal combustion engine starts cranking.

Note that a configuration for supplying hydraulic pressure to the clutch described above using an electrically-driven oil pump and a configuration for configuring the second clutch as an electromagnetic clutch are also considered. However, these configurations are disadvantageous in a number of parts and cost as compared with the configuration in which the clutch operated by being supplied with hydraulic pressure is combined with the mechanical oil pump for supplying hydraulic pressure.

Accordingly, in hybrid vehicles including the dual-clutch transmission as described above, a technique is desired that executes cranking of an internal combustion engine by transmitting the mechanical power from a rotor of a motor to an engine output shaft without executing the engaging/disengaging operation of the second clutch described above when cranking of the internal combustion engine is executed.

An object of the present invention, which was made in view of the above circumstances, is to provide a vehicle driving apparatus capable of executing cranking of an internal combustion engine by transmitting the mechanical power from a rotor of a motor disposed as a prime mover to an engine output shaft without executing an engaging/disengaging operation of a clutch.

Means for Solving Problem

In order to achieve the above mentioned object, a vehicle driving apparatus according to the present invention used to a vehicle including an internal combustion engine and a motor as prime movers and can change a speed of a mechanical power output from an engine output shaft of the internal combustion engine and a rotor of the motor by a speed change mechanism and transmit the mechanical power to drive wheels, the apparatus includes a first speed change mechanism capable of receiving the mechanical power from the engine output shaft by a first input shaft, changing the speed of the mechanical power by any one of a plurality of speed change stages, and transmitting the mechanical power to the drive wheels; a second speed change mechanism capable of receiving the mechanical power from the engine output shaft and the rotor by a second input shaft engaged with the rotor, changing the speed of the mechanical power by any one of the plurality of speed change stages, and transmitting the mechanical power to the drive wheels; a first clutch capable of engaging the engine output shaft with the first input shaft; and a second clutch capable of engaging the engine output shaft with the second input shaft, wherein the second clutch is placed in an engaged state when operation force for executing an engaging/disengaging operation is not applied to the second clutch.

In the vehicle driving apparatus according to the present invention, it is possible to configure that the first clutch is placed in a disengaged state when operation force for executing the engaging/disengaging operation is not applied to the first clutch.

In the vehicle driving apparatus according to the present invention, it is possible to configure that a controller capable of controlling a selection of a speed change stage in the second speed change mechanism and powering of the motor is included, wherein the controller can cause the motor to execute powering by placing the speed change stages in the second speed change mechanism in a state that any of the speed change stages is not selected, when cranking of the internal combustion engine is executed while the vehicle stops.

In the vehicle driving apparatus according to the present invention, it is possible to configure that a controller capable of controlling a selection of a speed change stage in the first and second speed change mechanisms, the engaging/disengaging state of the first clutch, and powering of the motor is included, wherein when the vehicle is started, the controller can place the speed change stages in the second speed change mechanism in a state that any of the speed change stages is not selected, cause the motor to execute powering, and place the first clutch in the engaged state.

In the vehicle driving apparatus according to the present invention, it is possible to configure that the speed change stages of the first speed change mechanism includes a first speed change stage that is a speed change stage on the lowest speed side, wherein when the vehicle is started, the controller can select the first speed change stage of the first speed change mechanism.

Effect of the Invention

According to the present invention, since the second clutch is placed in an engaged state when operation force for executing an engaging/disengaging operation is not applied to the second clutch, the driving apparatus can rotationally drive the engine output shaft without executing the engaging/disengaging operation to the second clutch by placing the speed change stages of the second speed change mechanism in a state that any of the speed change stages is not selected as well as causing the motor to execute powering by placing the first clutch in a disengaging state.

BEST MODE(S) FOR CARRYING OUT THE INVENTION

A mode for embodying the present invention (hereinafter, described as an embodiment) will be explained below in detail. Note that the present invention is by no means limited by the embodiment. Further, the components in the embodiment include components that can be easily conceived by persons skilled in the art or substantially the same components as the above components.

Figure 1:
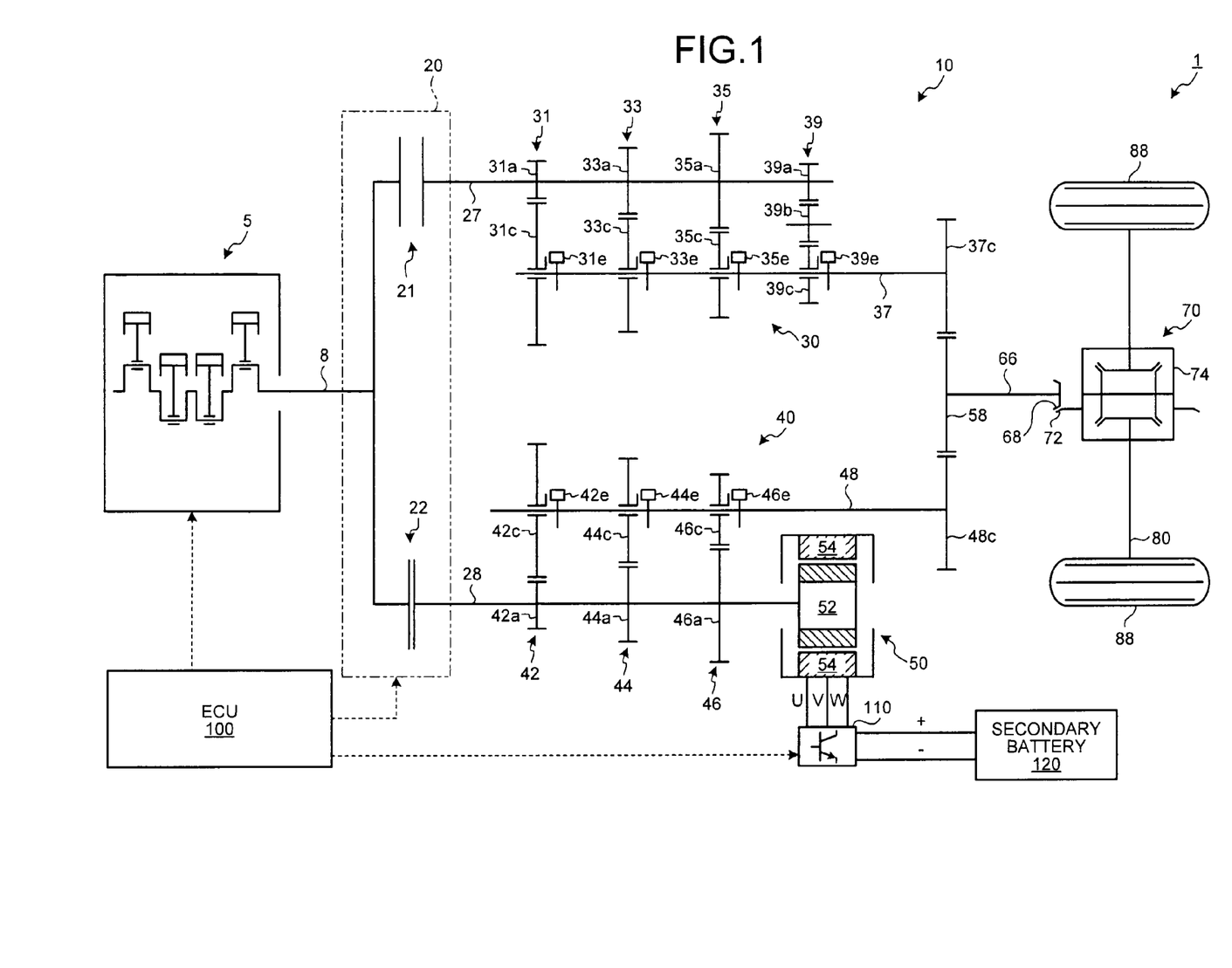
FIG. 1 is a schematic view illustrating a schematic configuration of a hybrid vehicle according to an embodiment.
Figure 2:
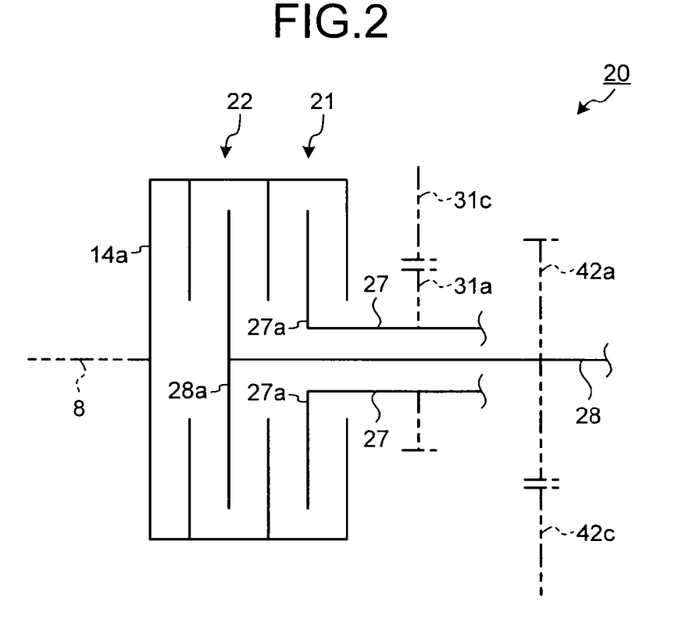
FIG. 2 is a schematic view explaining a structure of a dual-clutch mechanism according to the embodiment.
Figure 3:
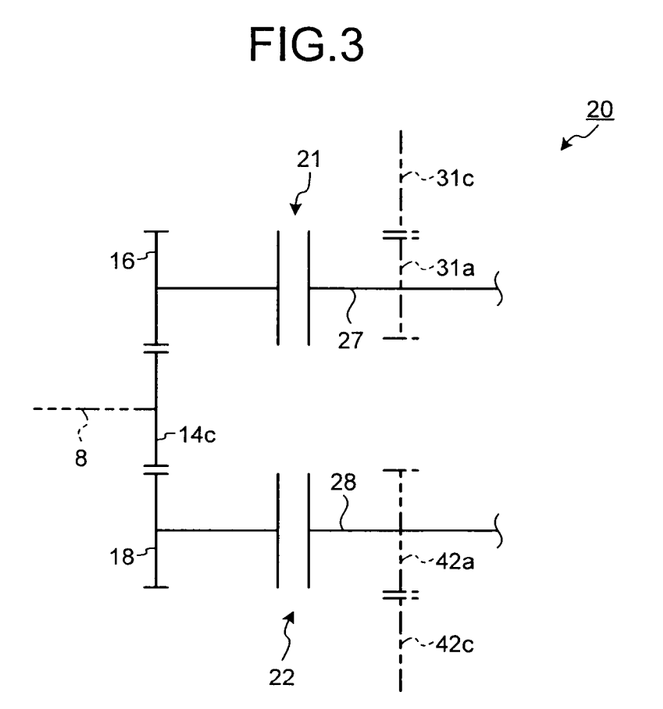
FIG. 3 is a schematic view explaining a structure of a dual-clutch mechanism of a modification according to the embodiment.

First, configurations of a hybrid vehicle and a driving apparatus according to the embodiment will be explained using FIGS. 1 to 3. FIG. 1 is a schematic view illustrating schematic configurations of the hybrid vehicle and the driving apparatus. FIG. 2 is a schematic view illustrating a structure of a dual-clutch mechanism disposed to the driving apparatus. FIG. 3 is a schematic view illustrating a structure of a dual-clutch mechanism of a modification.

A hybrid vehicle 1 includes a single internal combustion engine 5 and a single motor generator 50 (hereinafter, simply described as "motor") as prime movers for driving drive wheels 88 in rotation. The motor 50 is included in a driving apparatus 10 for changing the speed of the mechanical power from the internal combustion engine 5 and transmitting the mechanical power to a vehicle propeller shaft 66. The internal combustion engine 5 is coupled with the driving apparatus 10 including the motor 50 and mounted on the hybrid vehicle 1. The hybrid vehicle 1 is provided with a hybrid vehicle electronic control unit 100 (hereinafter, described as an ECU) as a controller (control means) for controlling the internal combustion engine 5 and the driving apparatus 10.

The internal combustion engine 5 includes a fuel injection device, an ignition device, and a throttle valve device any of which is not shown. These devices are controlled by the ECU 100. The mechanical power generated by the internal combustion engine 5 is output from an output shaft (crank shaft) 8. The output shaft 8 (hereinafter, described as an engine output shaft) of the internal combustion engine 5 is coupled with an input side of a dual-clutch mechanism 20 of the driving apparatus 10 to be described later, for example, with a clutch housing 14a (refer to FIG. 2). The ECU 100 can adjust the mechanical power output from the engine output shaft 8 of the internal combustion engine 5.

Further, the hybrid vehicle 1 is provided with the driving apparatus 10 that changes the torque of the mechanical power from the engine output shaft 8 and the motor 50 by changing the speed of the mechanical power and can output the mechanical power to a drive shaft 80 as a power transmission device for transmitting the mechanical power from the internal combustion engine 5 and the motor 50 as the prime movers to the drive wheels 88.

The driving apparatus 10 includes the dual-clutch mechanism 20 for transmitting the mechanical power from the engine output shaft 8 of the internal combustion engine 5 to a speed change mechanism to be described later using any of a first clutch 21 and a second clutch 22, a first speed change mechanism 30 capable of transmitting the mechanical power, which is transmitted from the internal combustion engine 5 through the first clutch 21 from a first output shaft 37 to the vehicle propeller shaft 66 by receiving the mechanical power by a first input shaft 27 and changing the speed of the mechanical power by any one of a first group of speed change stages, a second speed change mechanism 40 capable of transmitting the mechanical power, which is transmitted from the internal combustion engine 5 through the second clutch 22, from a second output shaft 48 to the vehicle propeller shaft 66 by receiving the mechanical power by a second input shaft 28 and changing the speed of the mechanical power by any one of a second group of speed change stages, and a final speed reduction device 70 for reducing the speed of the mechanical power transmitted to the vehicle propeller shaft 66 as well as distributing the mechanical power to right and left drive shafts 80 engaged with the drive wheels 88. A dual-clutch transmission (20, 30, 40) is composed of the first speed change mechanism 30, the second speed change mechanism 40, and the dual-clutch mechanism 20.

The first speed change mechanism 30 and the second speed change mechanism 40 have six speed change stages from a first speed gear stage 31 to a sixth speed gear stage 46 in a forward travel direction and one speed change stage, a rearward gear stage 39 in a rearward travel direction. The speed reduction ratios of the first speed gear stage 31 to the sixth speed gear stage 46 as the forward speed change stages are sequentially reduced in the order of the first speed gear stage 31, the second speed gear stage 42, the third speed gear stage 33, the fourth speed gear stage 44, the fifth speed gear stage 35, and the sixth speed gear stage 46. That is, the first speed gear stage 31 of the first speed gear stage 31 to the sixth speed gear stage 46 is a speed gear stage on the lowest speed side.

The first speed change mechanism 30 is configured as a parallel shaft gear device having plural gear pairs, and the first group of the speed change stages is composed of odd speed change stages, i.e., the first speed gear stage 31, the third speed gear stage 33, the fifth speed gear stage 35, and the rearward gear stage 39. The fifth speed gear stage 35 of the forward speed change stages 31, 33, 35 of the first speed change mechanism 30 is a speed change stage on the highest speed side. Note that, in the following explanation, a "coupling mechanism" is composed of a mesh clutch such as a dog clutch.

The first speed gear stage 31 is composed of a gear pair and includes a first speed main gear 31a as a fixed gear coupled with the first input shaft 27 and a first speed counter gear 31c as a loose gear disposed rotatably about the first output shaft 37 and meshed with the first speed main gear 31a. A first speed coupling mechanism 31e, which can engage the first speed counter gear 31c with the first output shaft 37 in correspondence with the first speed gear stage 31, is disposed to the first speed change mechanism 30.

When the ECU 100 selects the first speed gear stage 31 (places the first speed gear stage 31 in an engaged state), that is, when the ECU 100 places the first speed coupling mechanism 31e in the engaged state and engages the first speed counter gear 31c with the first output shaft 37, the mechanical power from the first input shaft 27 is transmitted to the first output shaft 37 through the first speed main gear 31a and the first speed counter gear 31c. With this operation, the first speed change mechanism 30 can change the speed of the mechanical power received from the first input shaft 27 by the first speed gear stage 31, change the torque of the mechanical power, and transmit the mechanical power to the first output shaft 37.

The third speed gear stage 33 is composed of a gear pair and includes a third speed main gear 33a as a fixed gear coupled with the first input shaft 27 and a third speed counter gear 33c as a loose gear disposed rotatably about the first output shaft 37 and meshed with the third speed main gear 33a. A third speed coupling mechanism 33e, which can engage the third speed counter gear 33c with the first output shaft 37 in correspondence with the third speed gear stage 33, is disposed to the first speed change mechanism 30.

When the ECU 100 selects the third speed gear stage 33 (places the third speed gear stage 33 in the engaged state), that is, when the ECU 100 places the third speed coupling mechanism 33e in the engaged state and engages the third speed counter gear 33c with the first output shaft 37, the first speed change mechanism 30 can change the speed of the mechanical power received from the first input shaft 27 by the third speed change stage 33, change the torque of the mechanical power, and transmit the mechanical power to the first output shaft 37.

Further, the fifth speed gear stage 35 is composed of a gear pair and includes a fifth speed main gear 35a as a fixed gear coupled with the first input shaft 27 and a fifth speed counter gear 35c as a loose gear disposed rotatably about the first output shaft 37 and meshed with the fifth speed main gear 35a. A fifth speed coupling mechanism 35e, which can engage the fifth speed counter gear 35c with the first output shaft 37 in correspondence with the fifth speed gear stage 35, is disposed to the first speed change mechanism 30.

When the ECU 100 selects the fifth speed gear stage 35 (places the fifth speed stage 35 in the engaged state), that is, when the ECU 100 places the fifth speed coupling mechanism 35e in the engaged state and engages the fifth speed counter gear 35c with the first output shaft 37, the first speed change mechanism 30 can change the speed of the mechanical power received from the first input shaft 27 by the fifth speed gear stage 35, change the torque of the mechanical power, and transmit the mechanical power to the first output shaft 37.

Further, the rearward gear stage 39 includes a rearward main gear 39a as a fixed gear coupled with the first input shaft 27, a rearward intermediate gear 39b meshed with the rearward main gear 39a, and a rearward counter gear 39c as a loose gear meshed with the rearward intermediate gear 39b and disposed rotatably about the first output shaft 37. A rearward coupling mechanism 39e, which can engage the rearward counter gear 39c with the first output shaft 37 in correspondence with the rearward gear stage 39, is disposed to the first speed change mechanism 30.

When the ECU 100 selects the rearward gear stage 39 (places the rearward gear stage 39 in the engaged state), that is, when the ECU 100 places the rearward coupling mechanism 39e in the engaged state and engages the rearward counter gear 39c with the first output shaft 37, the first speed change mechanism 30 can change the rotating direction of the mechanical power received from the first input shaft 27 to a reverse direction as well as change the speed of the mechanical power by the rearward gear stage 39, change the torque of the mechanical power, and transmit the mechanical power to the first output shaft 37.

A first drive gear 37c is coupled with the first output shaft 37 of the first speed change mechanism 30 and meshed with a power integration gear 58. The vehicle propeller shaft 66 is coupled with the power integration gear 58. The vehicle propeller shaft 66 is engaged with the drive shafts 80 coupled with the drive wheels 88 through the final speed reduction device 70 to be described later. That is, the first output shaft 37 of the first speed change mechanism 30 is engaged with the drive shafts 80 and the drive wheels 88.

As described above, switching of the respective coupling mechanisms 31*e*, 33*e*, 35*e*, 39*e* in the first speed change mechanism 30 between the engaged state and a disengaged state (non-engaged state) is controlled by the ECU 100 through a not shown actuator. When the ECU 100 selects any one speed change stage of the speed change stages 31, 33, 35, 39 of the first speed change mechanism 30 (places any one speed change stage of the speed change stages 31, 33, 35, 39 in the engaged state), the ECU 100 places the coupling mechanism, which corresponds to the speed change stage to be selected (to be placed in the engaged state), in the engaged state as well as places the coupling mechanisms, which correspond to the speed change stages that are not selected in the first speed change mechanism 30, in the disengaged state. With this operation, the first speed change mechanism 30 can change the speed of the mechanical power received by the first input shaft 27 by the selected speed change stage (in the engaged state), transmit the mechanical power to the first output shaft 37, and output the mechanical power to the drive shafts 80.

Further, when the ECU 100 does not select any of the speed change stages 31, 33, 35, 39 of the first speed change mechanism 30, the ECU 100 places all the coupling mechanisms 31*e*, 33*e*, 35*e*, 39*e* of the respective speed change stages 31, 33, 35 of the first speed change mechanism 30 in the disengaged state. With this operation, the first speed change mechanism 30 can interrupt a transmission of the mechanical power between the first input shaft 27 and the first output shaft 37.

In contrast, the second speed change mechanism 40 is configured as a parallel shaft gear device having plural gear pairs likewise the first speed change mechanism 30, and the second group of the speed change stages are composed of even speed change stages, i.e., the second speed gear stage 42, the fourth speed change stage 44, and the sixth speed gear stage 46. A rotor 52 of the motor 50 to be described later is coupled with the input shaft 28 (hereinafter, described as a second input shaft) of the second speed change mechanism 40.

The second speed gear stage 42 is composed of a gear pair and includes a second speed main gear 42*a* as a fixed gear coupled with the second input shaft 28 and a second speed counter gear 42*c* as a loose gear disposed rotatably about the second output shaft 48 and meshed with the second speed main gear 42*a*. A second speed coupling mechanism 42*e*, which can engage the second speed counter gear 42*c* with the second output shaft 48 in correspondence with the second speed gear stage 42, is disposed to the second speed change mechanism 40.

When the ECU 100 selects the second speed gear stage 42 (places the second speed gear stage 42 in the engaged state), that is, when the ECU 100 places the second speed coupling mechanism 42*e* in the engaged state and engages the second speed counter gear 42*c* with the second output shaft 48, the mechanical power from the second input shaft 28 is transmitted to the second output shaft 48 through the second speed main gear 42*a* and the second speed counter gear 42*c*. With this operation, the second speed change mechanism 40 can change the speed of the mechanical power received from the second input shaft 28 by the second speed gear stage 42, change the torque of the mechanical power, and transmit the mechanical power to the second output shaft 48.

The fourth speed change stage 44 is composed of a gear pair and includes a fourth speed main gear 44*a* as a fixed gear coupled with the second input shaft 28 and a fourth speed counter gear 44*c* as a loose gear disposed rotatably about the second output shaft 48 and meshed with the fourth speed main gear 44*a*. A fourth speed coupling mechanism 44*e*, which can engage the fourth speed counter gear 44*c* with the second output shaft 48 in correspondence with the fourth speed change stage 44, is disposed to the second speed change mechanism 40.

When the ECU 100 selects the fourth speed gear stage 44 (places the fourth speed gear stage 44 in the engaged state), that is, when the ECU 100 places the fourth speed coupling mechanism 44*e* in the engaged state and engages the fourth speed counter gear 44*c* with the second output shaft 48, the second speed change mechanism 40 can change the speed of the mechanical power received from the second input shaft 28 by the fourth speed gear stage 44, change the torque of the mechanical power, and transmit the mechanical power to the second output shaft 48.

The sixth speed gear stage 46 is composed of a gear pair and includes a sixth speed main gear 46*a* as a fixed gear coupled with the second input shaft 28 and a sixth speed counter gear 46*c* as a loose gear disposed rotatably about the second output shaft 48 and meshed with the sixth speed main gear 46*a*. A sixth speed coupling mechanism 46*e*, which can engage the sixth speed counter gear 46*c* with the second output shaft 48 in correspondence with the sixth speed gear stage 46, is disposed to the second speed change mechanism 40.

When the ECU 100 selects the sixth speed gear stage 46 (places the sixth speed gear stage 46 in the engaged state), that is, when the ECU 100 places the sixth speed coupling mechanism 46*e* in the engaged state and engages the sixth speed counter gear 46*c* with the second output shaft 48, the second speed change mechanism 40 can change the speed of the mechanical power received from the second input shaft 28 by the sixth speed gear stage 46, change the torque of the mechanical power, and transmit the mechanical power to the second output shaft 48.

A second drive gear 48*c* is coupled with the second output shaft 48 of the second speed change mechanism 40 and meshed with the power integration gear 58. The vehicle propeller shaft 66 is coupled with the power integration gear 58 and engaged with the drive shafts 80 coupled with the drive wheels 88 through the final speed reduction device 70 to be described later. That is, the second output shaft 48 of the second speed change mechanism 40 is engaged with the drive shafts 80 and the drive wheels 88.

As described above, switching of the engaged state and the disengaged state (non-engaged state) of the respective coupling mechanisms 42*e*, 44*e*, 46*e* in the second speed change mechanism 40 is controlled by the ECU 100 through a not shown actuator. When the ECU 100 selects any one speed change stage of the speed change stages 42, 44, 46 of the second speed change mechanism 40 (places any one of the speed change stages 42, 44, 46 in the engaged state), the ECU 100 places the coupling mechanism, which corresponds to the speed change stage to be selected (to be placed in the engaged state), in the engaged state as well as places the coupling mechanisms, which correspond to the speed change stages that are not selected in the second speed change mechanism 40, in the disengaged state. With this operation, the second speed change mechanism 40 can change the speed of the mechanical power, which is received by the second input shaft 28, by the selected speed change stage (in the engaged state), transmit the mechanical power to the second output shaft 48, and output the mechanical power to the drive shafts 80.

Further, when the ECU 100 does not select any of the speed change stages 42, 44, 46 of the second speed change mechanism 40, the ECU 100 disengages all the coupling mechanisms 42e, 44e, 46e of the respective speed change stages 42, 44, 46 of the second speed change mechanism 40. With this operation, the second speed change mechanism 40 can interrupt transmission of the mechanical power between the second input shaft 28 and the second output shaft 48.

Further, the driving apparatus 10 of the hybrid vehicle 1 is provided with the dual-clutch mechanism 20 as a power transmission device for transmitting the mechanical power, which is output from the engine output shaft 8 by the internal combustion engine 5, to any one of the first speed change mechanism 30 and the second speed change mechanism 40. The dual-clutch mechanism 20 includes the first clutch 21 as a friction clutch device capable of engaging the engine output shaft 8 with the first input shaft 27 of the first speed change mechanism 30 and the second clutch 22 as a friction clutch device capable of engaging the engine output shaft 8 with the second input shaft 28 of the second speed change mechanism 40. Note that the first clutch 21 and the second clutch 22 are composed of a friction clutch mechanism, and a wet multi-plate clutch and a dry single-plate clutch can be used as the first clutch 21 and the second clutch 22.

The first clutch 21 includes a disc-shaped friction plate and is composed of a friction disc clutch and the like for transmitting the mechanical power by the friction force of a friction plate. The first clutch 21 can engage the engine output shaft 8 of the internal combustion engine 5 with the first input shaft 27 of the first speed change mechanism 30. The engine output shaft 8 can be engaged with the first input shaft 27 and rotated integrally with the first input shaft 27 by placing the first clutch 21 in the engaged state.

An engaging/disengaging operation is applied to the first clutch 21 by a hydraulic actuator (not shown) and the like. When operation force for executing the engaging/disengaging operation is not applied to the first clutch 21 by the actuator, the first clutch 21 is placed in the disengaged state, and thus the first clutch 21 is configured as a so-called normally open clutch.

The second clutch 22 is composed of a friction disc clutch and the like likewise the first clutch 21 and can engage the engine output shaft 8 of the internal combustion engine 5 with the second input shaft 28 of the second speed change mechanism 40. The engine output shaft 8 can be engaged with the second input shaft 28 and rotated integrally with the second input shaft 28 by placing the second clutch 22 in the engaged state.

The engaging/disengaging operation is applied to the second clutch 22 by a hydraulic actuator (not shown) and the like. When the operation force for executing the engaging/disengaging operation is not applied to the second clutch 22 by the actuator, the second clutch 22 is placed in the engaged state, and thus the second clutch 22 is configured as a so-called normally closed clutch.

Switching of the first clutch 21 and the second clutch 22 between the engaged state and the disengaged state (non-engaged state) is controlled by the ECU 100 through a not shown actuator. In the dual-clutch mechanism 20, when the ECU 100 places any one of the first clutch 21 and the second clutch 22 in the engaged state and places the other of the first clutch 21 and the second clutch 22 in the disengaged state, the ECU 100 can transmit the mechanical power from the internal combustion engine 5 to any one of the first speed change mechanism 30 and the second speed change mechanism 40.

An example of a detailed structure of the dual-clutch mechanism 20 composed of the first clutch 21 and the second clutch 22 will be explained using FIG. 2. As shown in FIG. 2, in the dual-clutch mechanism 20, the clutch housing 14a of the dual-clutch mechanism 20 is coupled with the engine output shaft 8. That is, the clutch housing 14a is rotated integrally with the engine output shaft 8. The clutch housing 14a can accommodate friction plates 27a, 28a to be described later.

In contrast, the first input shaft 27 of the first speed change mechanism 30 and the second input shaft 28 of the second speed change mechanism 40 are coaxially disposed and have a double shaft structure. Specifically, the first input shaft 27 is composed of a hollow shaft, and the second input shaft 28 extends into the first input shaft 27. The second input shaft 28 that is an inner shaft is configured axially longer than the first input shaft 27 that is an outer shaft. First, main gears 31a, 33a, 35a, 39a of the respective speed change stages of the first speed change mechanism 30 are disposed from the engine output shaft 8 side toward the drive wheels 88 side, and, next, main gears 42a, 44a, 46a of the respective speed change stages of the second speed change mechanism 40 are disposed.

The disc-shaped friction plate 27a is coupled with an end of the first input shaft 27, whereas the friction plate 28a is also coupled with an end of the second input shaft 28 likewise. The friction plates 27a, 28a are accommodated in the clutch housing 14a described above and constitute the first clutch 21 and the second clutch 22.

The first clutch 21 includes a friction counterpart plate (not shown) disposed in the clutch housing 14a so as to confront the friction plate 27a and an actuator (not shown) for operating the friction counterpart plate. The actuator executes the engaging/disengaging operation of the first clutch 21.

In the first clutch 21, the friction counterpart plate is urged by a not shown "spring" (urging member) in a direction opposite to a direction in which the friction counterpart plate comes into contact with the friction plate 27a. That is, when the operation force is not applied to the first clutch 21 by the actuator, since the friction plate 27a is not engaged with the clutch housing 14a, the first clutch 21 is placed in the "disengaged state" in which a power transmission is interrupted between the first input shaft 27 and the engine output shaft 8. Note that various types of springs such as a diaphragm spring and a coil spring can be used as the "spring" as the urging member.

In the first clutch 21, when the friction counterpart plate is operated by the actuator, the friction counterpart plate is pressed against the friction plate 27a, and the friction plate 27a is engaged with the clutch housing 14a. That is, when the operation force for executing the engaging/disengaging operation is applied to the first clutch 21 by the actuator, the first input shaft 27 coupled with the friction plate 27a is engaged with the engine output shaft 8 coupled with the clutch housing 14a.

In contrast, when the friction counterpart plate is not operated by the actuator, that is, when the operation force for executing the engaging/disengaging operation is not applied to the first clutch 21, the friction counterpart plate is urged by the spring so that the friction counterpart plate does not come into contact with the friction plate 27a, and the first clutch 21 is placed in the disengaged state in which the power transmission is interrupted between the first input shaft 27 coupled with the friction plate 27a and the engine output shaft 8 coupled with the clutch housing 14a. As described above, the first clutch 21 is placed in the disengaged state when the operation force for executing the engaging/disengaging operation is not applied by the actuator.

The second clutch 22 includes a friction counterpart plate (not shown) disposed to the clutch housing 14a so as to confront the friction plate 28a and an actuator (not shown) for operating the friction counterpart plate likewise the first clutch 21. The second clutch 22 is engaged and disengaged by the actuator.

In the second clutch 22, the friction counterpart plate is urged by a not shown "spring" (urging member) so as to come into contact with the friction plate 28a. That is, when the operation force is not applied to the second clutch 22 by the actuator, the friction plate 28a is engaged with the clutch housing 14a, and the second input shaft 28 is engaged with the engine output shaft 8. Note that various types of springs such as a diaphragm spring and a coil spring can be used as the "spring" as the urging member.

In the second clutch 22, when the friction counterpart plate is operated by the actuator, the friction counterpart plate is separated from the friction plate 28a, and the power transmission is interrupted between the friction plate 28a and the clutch housing 14a. That is, when the operation force for executing the engaging/disengaging operation is applied to the second clutch 22 by the actuator, the second clutch 22 is placed in the disengaged state in which the power transmission is interrupted between the second input shaft 28 coupled with the friction plate 28a and the engine output shaft 8 coupled with the clutch housing 14a.

In contrast, when the friction counterpart plate is not operated by the actuator, that is, when the operation force for executing the engaging/disengaging operation is not applied to the second clutch 22, the friction counterpart plate is urged by the spring so as to come into contact with the friction plate 28a, and the second input shaft 28 coupled with the friction plate 28a is engaged with the engine output shaft 8 coupled with the clutch housing 14a in the engaged state. As described above, the second clutch 22 is placed in the engaged state when the operation force for executing the engaging/disengaging operation is not applied to the second clutch 22 by the actuator.

Note that, in the detailed structure of the dual-clutch mechanism 20 described above, although the first input shaft 27 of the first speed change mechanism 30 and the second input shaft 28 of the second speed change mechanism 40 are coaxially disposed, the detailed structure of the dual-clutch mechanism 20 is not restricted thereto. As shown, in for example, FIG. 3, the first input shaft 27 and the second input shaft 28 may be disposed so as to extend in parallel with each other at a predetermined interval. In the dual-clutch mechanism 20 of the modification, a drive gear 14c is coupled with an end of the engine output shaft 8. A first gear 16 and a second gear 18 are meshed with the drive gear 14c, the first gear 16 is coupled with the first clutch 21, and the second gear 18 is coupled with the second clutch 22. The first clutch 21 can engage the first input shaft 27 of the first speed change mechanism 30 with the first gear 16 engaged with the engine output shaft 8. In contrast, the second clutch 22 can engage the second input shaft 28 of the second speed change mechanism 40 with the second gear 18 engaged with the engine output shaft 8.

The first and second clutches 21, 22 can be composed of an arbitrary clutch mechanism such as a friction clutch, respectively, and the first clutch 21 is placed in the disengaged state when the operation force for executing the engaging/disengaging operation is not applied thereto. In contrast, the second clutch 22 is placed in the engaged state when the operation force is not applied thereto. In the first clutch 21 and the second clutch 22, when the engaged state and the disengaged state are alternately switched, the mechanical power of the internal combustion engine 5, which is output from the engine output shaft 8, is transmitted from the drive gear 14c to any of the first input shaft 27 of the first speed change mechanism 30 and the second input shaft 28 of the second speed change mechanism 40.

Note that the engaged/disengaged state of the first and second clutches 21, 22, i.e., the operation force for executing the engaging/disengaging operation to the first and second clutches 21, 22 by the actuator is controlled by the ECU 100.

Further, the driving apparatus 10 of the hybrid vehicle 1 is provided with the motor 50 as the prime mover. That is, the driving apparatus 10 includes the dual-clutch transmission (20, 30, 40), which is composed of the dual-clutch mechanism 20, the first speed change mechanism 30, and the second speed change mechanism 40, and the motor 50, i.e., a so-called motor generator having both a function as an electric motor for converting the electric power supplied thereto to mechanical power and outputting the mechanical power and a function as a generator for converting the mechanical power input thereto to electric power and collecting the electric power. The motor 50 is composed of a permanent magnet alternating current synchronous motor and includes a stator 54 for forming a rotary magnetic field by being supplied with three-phase alternating electric power from an inverter 110 to be described later and the rotor 52 rotating by being attracted to the rotary magnetic field. A resolver (not shown) is disposed to the motor 50 to detect a rotation angle position of the rotor 52 and send a signal of the rotation angle position of the rotor 52 to the ECU 100.

The rotor 52 of the motor 50 is coupled with the second input shaft 28 of the second speed change mechanism 40, and the mechanical power (torque) output from the rotor 52 of the motor 50 is transmitted to the second input shaft 28 of the second speed change mechanism 40. That is, the rotor 52 of the motor 50 is engaged with the second input shaft 28 of the second speed change mechanism 40. Further, the motor 50 can also convert the mechanical power (torque), which is transmitted from the drive wheels 88 to the rotor 52 through the second output shaft 48, to alternating electric power and collect the alternating electric power to a secondary battery 120.

Note that a speed reduction mechanism, which reduces the rotating speed of the rotor 52 and transmits the rotation of the rotor 52 to the second input shaft 28, and a speed change mechanism, which changes the rotating speed of the rotation of the rotor 52 and transmits the rotation of the rotor 52 to the second input shaft 28, may be disposed between the second input shaft 28 and the rotor 52. In contrast, a rotor of the motor generator is not coupled with the first input shaft 27 of the first speed change mechanism 30. When at least one of the first clutch 21 and the second clutch 22 is placed in the disengaged state, the first input shaft 27 of the first speed change mechanism 30 does not receive the mechanical power output from the rotor 52 of the motor 50.

Note that, in the following explanation, it is described as "powering" that the motor 50 is caused to function as the electric motor and the motor 50 outputs the mechanical power from the rotor 52. In contrast, it is described as a "regenerative braking" to function the motor 50 as the generator, to convert the mechanical power transmitted from the drive wheels 88 to the rotor 52 of the motor 50 to electric power and to collect the electric power as well as to brake the rotation of the rotor 52 and the members (for example, the drive wheels 88) engaged with the rotor 52 by the rotation resistance generated to the rotor at the time. Switching between the powering and the regenerative braking executed by the motor 50, i.e., switching between the function as the electric motor and the function as the generator of the motor 50 is controlled by the ECU 100.

Further, the hybrid vehicle 1 is provided with the inverter 110 as an electric power supply device for supplying alternating electric power to the motor 50. The inverter 110 can convert the direct current electric power supplied from the secondary battery 120 to alternating current electric power and supply the alternating current electric power to the motor 50. Further, the inverter 110 can also convert the alternating current electric power supplied from the motor 50 to direct current electric power and collect the direct current electric power to the secondary battery 120. The supply of the electric power from the inverter 110 to the motor 50 and the collection of the electric power from the motor 50 are controlled by the ECU 100.

Further, the driving apparatus 10 of the hybrid vehicle 1 is provided with the final speed reduction device 70 for reducing the speed of the mechanical power transmitted from the prime movers to the vehicle propeller shaft 66 as well as distributing the mechanical power to the right and left drive shafts 80 engaged with the drive wheels 88. The final speed reduction device 70 includes a drive pinion 68 coupled with the vehicle propeller shaft 66 and a differential mechanism 74 in which the drive pinion 68 is approximately orthogonally meshed with a ring gear 72. The final speed reduction device 70 can reduce the speed of the mechanical power, which is transmitted from at least one of the prime movers, i.e., the internal combustion engine 5 and the motor 50 to the vehicle propeller shaft 66 by the drive pinion 68 and the ring gear 72, distributes the mechanical power to the right and left drive shafts 80 by the differential mechanism 74, and rotationally drive the drive wheels 88 coupled with the drive shafts 80.

Further, the hybrid vehicle 1 is provided with the ECU 100 as the controller for controlling the speed change operations in the internal combustion engine 5 and the motor 50 and in the first and second speed change mechanisms 30, 40 and an operation for placing the first and second clutches 21, 22 in the engaging/disengaging state in cooperation therewith. The ECU 100 detects the signal of the rotation angle position (hereinafter, described as a crank angle) of the engine output shaft 8, the signal of the state of charge (SOC) of the secondary battery 120, the signal of the rotation angle position of the rotor 52 of the motor 50, and the like. Further, the ECU 100 detects the speed change stages selected in the first speed change mechanism 30 and the second speed change mechanism 40, i.e., the engaging/disengaging states of the coupling mechanisms 31e to 46e, and the engaging/disengaging states of the first and second clutches 21, 22. Further, the ECU 100 detects the signal of the amount of operation of an accelerator pedal (not shown) and the signal of the amount of operation of a brake pedal (not shown) each operated by a driver.

The ECU 100 calculates various control variables based on these signals. The control variables include a rotation speed (hereinafter, described as an engine rotation speed) of the engine output shaft 8 of the internal combustion engine 5, torque (hereinafter, described as engine load) output from the engine output shaft 8 by the internal combustion engine 5, a motor rotation speed as the rotation speed of the rotor 52 of the motor 50, torque (hereinafter, described as motor output torque) output from the rotor 52 by the motor 50, a traveling speed (hereinafter, described as a vehicle speed) of the hybrid vehicle 1, the state of charge (SOC) of the secondary battery 120, and the like.

The ECU 100 finds the operation states of the internal combustion engine 5 and the motor 50 based on the control variables. The ECU 100 can control the operation force for executing the speed change operations in the first and second speed change mechanisms 30, 40, i.e., the operation force for placing the coupling mechanisms 31e to 46e of the speed change stages 31 to 46 in the engaging/disengaging state and the operation force for placing the first clutch 21 and the second clutch 22 in the engaging/disengaging state, i.e., the operation force for executing the engaging/disengaging operation of the first clutch 21 and the second clutch 22. Further, the ECU 100 can control the output torque and the rotation speed of the motor and the engine load and the engine rotation speed of the internal combustion engine 5.

In the vehicle driving apparatus 10 configured as described above, when the ECU 100 selects any one speed change stage of the first group of the speed change stages 31, 33, 35, 39 of the first speed change mechanism 30, places a corresponding coupling mechanism in the engaged state and further places the first clutch 21 in the engaged state as well as places the second clutch 22 in the disengaged state, the engine output shaft 8 is engaged with the drive shafts 80 through the first input shaft 27, the first output shaft 37, the power integration gear 58, the vehicle propeller shaft 66, and the final speed reduction device 70. With this operation, the first speed change mechanism 30 can receive the mechanical power output from the engine output shaft 8 of the internal combustion engine 5 by the first input shaft 27, change the speed of the mechanical power by a selected speed change stage of the speed change stages (odd speed change stages) 31, 33, 35 and the rearward gear stage 39, change the torque of the mechanical power, and output the mechanical power to the drive shafts 80 engaged with the drive wheels 88.

In this case, the rotation of the drive wheels 88 is transmitted to the second output shaft 48 of the second speed change mechanism 40 through the power integration gear 58. When the ECU 100 selects any one speed change stage of the second group of the speed change stages 42, 44, 46 of the second speed change mechanism 40 and places a corresponding coupling mechanism in the engaged state, the speed of the mechanical power transmitted from the power integration gear 58 to the second output shaft 48 is changed by a selected speed change stage of the speed change stages (even speed change stages) 42, 44, 46 of the second speed change mechanism 40, and the mechanical power is transmitted to the second input shaft 28 and rotates the rotor 52 of the motor 50. Note that when the ECU 100 does not select any of the speed change stages 42, 44, 46 of the second speed change mechanism 40, i.e., when the ECU 100 places all the coupling mechanism 42e, 44e, 46e of the respective speed change stages 42, 44, 46 of the second speed change mechanism 40 in the disengaged state, the power transmission is interrupted between the second output shaft 48 and the second input shaft 28, and the rotation of the drive wheels 88 is not transmitted to the second input shaft 28.

In contrast, when the ECU 100 selects any one speed change stage of the second group of the speed change stages 42, 44, 46 of the second speed change mechanism 40, places the corresponding coupling mechanisms 42e, 44e, 46e in the engaged state and further places the second clutch 22 in the engaged state as well as places the first clutch 21 in the disengaged state, the engine output shaft 8 is engaged with the drive shafts 80 through the second input shaft 28, the second output shaft 48, the power integration gear 58, the vehicle propeller shaft 66, and the final speed reduction device 70. With this operation, the second speed change mechanism 40 can receive the mechanical power output from the engine output shaft 8 of the internal combustion engine 5 and the mechanical power output from the rotor 52 of the motor 50 by the second input shaft 28, change the speed of the mechanical power by a selected speed change stage of the respective speed change stages (even speed change stages) 42, 44, 46, change the torque of the mechanical power, and output the mechanical power to the drive shafts 80 engaged with the drive wheels 88.

In this case, the rotation of the drive wheels 88 is transmitted to the first output shaft 37 of the first speed change mechanism 30 through the power integration gear 58. When the ECU 100 selects any one speed change stage of the first group of the speed change stages 31, 33, 35, 39 of the first speed change mechanism 30 and places the corresponding coupling mechanisms 31e, 33e, 35e, 39e in the engaged state, the speed of the mechanical power transmitted from the power integration gear 58 to the first output shaft 37 is changed by a selected speed change stage (in the engaged state) of the speed change stages (odd speed change stages) 31, 33, 35 and the rearward gear stage 39 of the first speed change mechanism 30, and the mechanical power is transmitted to the first input shaft 27 and rotates the first input shaft 27. Note that when the ECU 100 does not select any of the speed change stages 31, 33, 35, 39 of the first speed change mechanism 30, i.e., when the ECU 100 places all the coupling mechanism 31e, 33e, 35e, 39e of the respective speed change stages 31,33,35 of the first speed change mechanism 30 in the disengaged state, the power transmission is interrupted between the first output shaft 37 and the first input shaft 27, and the rotation of the drive wheels 88 is not transmitted to the first input shaft 27.

The hybrid vehicle 1 configured as described above can suppress the interruption of the power transmission between the engine output shaft 8 and the drive wheels 88 when the speed of the mechanical power is changed by alternately connecting the first clutch 21 and the second clutch 22, which will be explained below in detail.

First, the ECU 100 selects any one speed change stage of the speed change stages 31 to 46 of the first and second speed change mechanisms 30, 40 (places any one speed change stage in the engaged state). When, for example, the selected speed change stage is the first speed gear stage 31 of the speed change stages 31, 33, 35, 39 of the first speed change mechanism 30, the ECU 100 places the first speed coupling mechanism 31e corresponding to the first speed gear stage 31 in the engaged state as well as places the other coupling mechanisms 33e, 35e, 39e in the disengaged state. Then, the ECU 100 places the first clutch 21 in the engaged state as well as places the second clutch 22 in the disengaged state. With this operation, the driving apparatus 10 can receive the mechanical power from the internal combustion engine 5 by the first input shaft 27, change the speed of the mechanical power by the first speed gear stage 31, which is a selected speed change stage of the first group (the odd stages) of the speed change stages 31, 33, 35, transmit the mechanical power from the first output shaft 37 to the drive shafts 80, and rotatably drive the drive wheels 88.

At the time, the ECU 100 rotates the second input shaft 28 of the second speed change mechanism 40 with no load by selecting the second speed gear stage 42 as a speed change stage of the speed change stages 42, 44, 46 of the second speed change mechanism 40, the second speed gear stage 42 being a speed change stage on one stage faster (high gear) side than the first speed gear stage 31 as the speed change stage selected in the first speed change mechanism 30 and placing the corresponding second speed coupling mechanism 42e in the engaged state. As described above, the ECU 100 makes preparation for the speed change operation from the first speed gear stage 31 to the second speed gear stage 42, i.e., for the engaging/disengaging operation of the first clutch 21 and the second clutch 22.

When a speed change (up-shift) from the first speed gear stage 31 of the first speed change mechanism 30 to the second speed gear stage 42 of the second speed change mechanism 40 is executed, the driving apparatus 10 executes a grip change operation, i.e., a so-called "clutch-to-clutch operation" of the first clutch 21 and the second clutch 22 by that the ECU 100 places the second clutch 22 in the engaged state while placing the first clutch 21 in the disengaged state. With this operation, the driving apparatus 10 gradually shifts a power transmission path from the engine output shaft 8 from the first input shaft 27 of the first speed change mechanism 30 to the second input shaft 28 of the second speed change mechanism 40 to thereby complete the speed change to the second speed gear stage 42.

As described above, when the driving apparatus 10 shifts a gear from a speed change stage of the first speed change mechanism 30, i.e., from the first speed gear stage 31 as an odd speed change stage to a speed change stage of the second speed change mechanism 40, i.e., to the second speed gear stage 42 as an even speed change stage, the driving apparatus 10 can shift the gear without causing the interruption of the power transmission from the engine output shaft 8 to the drive shafts 80.

Next, a control process of cranking of the internal combustion engine while the hybrid vehicle according to the embodiment stops (hereinafter, described as a cranking control) will be explained using FIG. 1.

First, while the vehicle stops, the ECU 100 interrupts the power transmission between the second input shaft 28 and the second output shaft 48 in the state that any of the speed change stages 42, 44, 46 is not selected, i.e., all the coupling mechanisms 42e, 44e, 46e corresponding to the speed change stages 42, 44, 46, respectively are placed in the disengaged state in the second speed change mechanism 40.

At the time, since the operation force for executing the engaging/disengaging operation by the actuator is not applied to the second clutch 22, the second clutch 22 as the normally-closed clutch is placed in the engaged state. The engine output shaft 8 is engaged with the rotor 52 of the motor 50 through the second clutch 22 and the second input shaft 28.

In contrast, since the operation force for executing the engaging/disengaging operation by the actuator is not applied to the first clutch 21 as the normally-open clutch, the first clutch 21 is placed in the disengaged state. The power transmission between the engine output shaft 8 and the first input shaft 27 is interrupted.

As described above, the rotor 52 of the motor 50 and the engine output shaft 8 can be rotated integrally irrespective of the drive wheels 88 at rest and of the rotating members (for example, the first output shaft 37 and the second output shaft 48) engaged with the drive wheels 88.

The ECU 100 causes the motor 50 to execute powering in response to a request for starting the internal combustion engine 5 while the vehicle stops. The mechanical power output from the rotor 52 of the motor 50 to the second input shaft 28 is transmitted from the second clutch 22 to the engine output shaft 8 and rotatably drives the engine output shaft 8. With this operation, the ECU 100 can execute cranking for starting the internal combustion engine 5 in the state that the drive wheels 88 are at rest.

Next, a control process (hereinafter, simply described as a "motor start control") of a start of the hybrid vehicle according to the embodiment executed by the motor will be explained using FIG. 1.

First, while the vehicle stops, the ECU 100 interrupts the power transmission between the second input shaft 28 and the second output shaft 48 in the state that any of the speed change stages 42, 44, 46 is not selected (all of them are placed in the disengaged state) in the second speed change mechanism 40. At the time, since the operation force is not applied to the second clutch 22 and the second clutch 22 is placed in the engaged state, the engine output shaft 8 is engaged with the rotor 52 of the motor 50 and can be rotated integrally with the rotor 52 of the motor 50.

In addition to the above-mentioned, the ECU 100 selects the first speed gear stage 31 in the first speed change mechanism 30 and places the corresponding coupling mechanism 31e in the engaged state as well as places the first clutch 21 in the engaged state. The ECU 100 places the first clutch 21 in the engaged state by causing the actuator to apply the operation force to the first clutch 21 and engages the engine output shaft 8 with the first input shaft 27.

The rotor 52 of the motor 50 is engaged with the engine output shaft 8, the first input shaft 27, the first output shaft 37, and the drive wheels 88 by placing the first and second clutches 21, 22 in the engaged state together as well as selecting the speed change stage (the first speed change stage) 31 (placing the speed change stage 31 in the engaged state) in the first speed change mechanism 30 as described above. Note that since the power transmission between the second input shaft 28 and the second output shaft 48 is interrupted in the second speed change mechanism 40, a double-mesh of gears does not occur in the driving apparatus 10. Note that, at the time, the first and second clutches 21, 22 may be placed in a half-engaged state.

The ECU 100 causes the motor 50 to execute powering in response to a request for starting the hybrid vehicle 1 while it stops. The mechanical power output to the second input shaft 28 from the rotor 52 of the motor 50 is transmitted to the first input shaft 27 through the first and second clutches 21, 22 in the engaged state. The speed of the mechanical power, which is transmitted from the rotor 52 of the motor 50 to the first input shaft 27, is changed by the first speed gear stage 31, and the mechanical power is transmitted from the first output shaft 37 to the vehicle propeller shaft 66, distributed to the right and left drive shafts 80 by the final speed reduction device 70, and rotationally drives the drive wheels 88. As described above, the ECU 100 can change the speed of the mechanical power from the rotor 52 of the motor 50 by a speed change stage of the first speed change mechanism 30 and transmit the mechanical power to the drive wheels 88 and start the hybrid vehicle 1. Note that the hybrid vehicle 1 may be started by placing the first clutch 21 in the engaged state or in the semi-engaged state after the powering of the motor 50 is started.

Note that a control method for starting the hybrid vehicle 1 is not limited to the control method of starting it by the motor described above, and the hybrid vehicle 1 can be started using the internal combustion engine as the prime mover. When the ECU 100 places the first clutch 21 in the engaged state after the internal combustion engine 5 is started by executing the cranking control described above, the hybrid vehicle 1 can be also started by transmitting the mechanical power, which is transmitted from the engine output shaft 8, from the first clutch 21 to the first input shaft 27, changing the speed of the mechanical power by the first speed change mechanism 30, and transmitting the mechanical power to the drive wheels 88.

As described above, the vehicle driving apparatus 10 according to the embodiment includes the first speed change mechanism 30 capable of receiving the mechanical power from the engine output shaft 8 by the first input shaft 27, changing the speed of the mechanical power by any one of the plural speed change stages 31, 33, 35, 39, and transmitting the mechanical power to the drive wheels 88, the second speed change mechanism 40 capable of receiving the mechanical power from the engine output shaft 8 and the rotor 52 by the second input shaft 28 engaged with the rotor 52, changing the speed of the mechanical power by any one of the plural speed change stages 42, 44, 46, and transmitting the mechanical power to the drive wheels 88, the first clutch 21 capable of engaging the engine output shaft 8 with the first input shaft 27, and the second clutch 22 capable of engaging the engine output shaft 8 with the second input shaft 28, and the second clutch 22 is configured as the so-called normally-closed clutch which is placed in the engaged state when the operation force for executing the engaging/disengaging operation is not applied to the second clutch 22.

With this configuration, when the vehicle driving apparatus 10 causes the motor 50 to execute powering by placing the speed change stages 42, 44, 46 of the second speed change mechanism 40 in the state that any of the speed change stages 42, 44, 46 is not selected (all of them are placed in the disengaged state) as well as placing the first clutch 21 in the disengaged state, the engine output shaft 8 can be rotationally driven without executing the engaging/disengaging operation to the second clutch 22.

Further, in the embodiment, since the first clutch 21 is composed of the so-called normally-open clutch that is placed in the disengaged state when the operation force for executing the engaging/disengaging operation is not applied to the first clutch 21, the engine output shaft 8 can be rotationally driven only by causing the motor 50 to execute powering in the state that any of the speed change stages 42, 44, 46 of the second speed change mechanism 40 is not selected (all the speed change stages 42, 44, 46 are placed in the disengaged state) without executing the engaging/disengaging operation to the first and second clutches 21, 22. In addition, the mechanical power output from the motor 50 to the second input shaft 28 can be transmitted to the first input shaft 27 through the first and second clutches 21, 22, the speed of the mechanical power can be changed by a speed change stage of the first speed change mechanism 30, and the mechanical power can be transmitted to the drive wheels 88 only by selecting any one of the speed change stages 31, 33, 35, 39 of the first speed change mechanism 30.

Further, even if the actuator for executing the engaging/disengaging operation to the first clutch 21 and the second clutch 22 does not operate by any reason, since the first clutch 21 is placed in the disengaged state, the double-mesh of the gears does not occur in the driving apparatus 10 even if any speed change stage is selected in the first and second speed change mechanisms 30, 40 and a coupling mechanism corresponding to the speed change stage is in the engaged state.

Further, since the embodiment includes the ECU 100 as the controller capable of controlling the selection of a speed change stage in the second speed change mechanism 40 and the powering of the motor 50, and the ECU 100 causes the motor 50 to execute powering without selecting any of the speed change stages in the second speed change mechanism 40 (placing all the speed change stages in the disengaged state) when the internal combustion engine 5 is started while the vehicle stops. As a result, it is possible to transmit the mechanical power, which is transmitted from the motor 50, from the second clutch 22 to the engine output shaft 8 and to rotationally drive the engine output shaft 8 without executing the engaging/disengaging operation to the first and second clutches 21, 22. With this operation, the internal combustion engine 5 can be started in the state that the hybrid vehicle 1 stops without executing the engaging/disengaging operation to the first and second clutches 21, 22.

Further, the embodiment includes the ECU 100 as the controller capable of controlling the selection of a speed change stage in the first and second speed change mechanisms 30, 40, the engaging/disengaging state of the first clutch 21, and the powering of the motor 50, and the ECU 100 does not select any of the speed change stages (places all the speed change stages in the disengaged state) in the second speed change mechanism 40 when the vehicle starts as well as causes the motor 50 to execute powering and places the first clutch 21 in the engaged state. The mechanical power from the motor 50 can be transmitted to the first input shaft 27 through the first and second clutches 21, 22, the speed of the mechanical power can be changed by the first speed change mechanism 30, and the mechanical power can be transmitted to the drive wheels 88 only by executing the engaging operation for placing the first clutch 21 in the engaged state. With this operation, the hybrid vehicle 1 can be started by selectively using only the motor 50.

Note that when the ECU 100 does not select any of the speed change stages (places all the speed change stages in the disengaged state) in the second speed change mechanism 40 as well as selects any one of the speed change stages of the first speed change mechanism 30, places the first clutch 21 in the engaged state, and causes the motor 50 to execute powering at the time the vehicle is started, the mechanical power from the motor 50 can be transmitted to the first input shaft 27 through the first and second clutches 21, 22, the speed of the mechanical power can be changed by a speed change stage of the first speed change mechanism 30, and the mechanical power can be transmitted to the drive wheels 88. With this operation, the hybrid vehicle 1 can be started by changing the speed of the mechanical power of the motor 50 by the first speed change mechanism 30 and transmitting the mechanical power to the drive wheels 88 only by executing the engaging operation for placing the first clutch 21 in the engaged state.

Note that, in the embodiment, since the speed change stages 31, 33, 35, 39 of the first speed change mechanism 30 include the first speed gear stage 31 on the lowest speed change stage (having the largest speed reduction ratio) and the ECU 100 as the controller selects the first speed gear stage 31 of speed change stages of the first speed change mechanism 30 (places the first speed gear stage 31 in the engaged state) when the vehicle is started, the ECU 100 can increase the torque of the mechanical power from the motor 50 by reducing the speed of the mechanical power by the speed change stage having the largest speed reduction ratio in the first and second speed change mechanisms 30, 40 and transmit the mechanical power to the drive wheels 88. With this operation, the hybrid vehicle 1 can be started by the mechanical power from the motor 50 by a good response property.

Note that, in the embodiment, although the speed change stages 42, 44, 46 of the second speed change mechanism 40, which is the speed change mechanism whose input shaft is engaged with the rotor 52 of the motor 50, are composed of the even speed change stages (the second speed gear stage, the fourth speed gear stage, the sixth speed gear stage), the aspect of the driving apparatus 10 to which the present invention can be applied is not limited thereto. The speed change stages of the first speed change mechanism whose input shaft is not engaged with the rotor of the motor may be composed of the even stages, and the speed change stages of the second speed change mechanism whose input shaft is engaged with the rotor of the motor may be composed of the odd speed change stages.

Further, in the embodiment, although the motor 50 that is provided as the prime mover is the motor generator having the function as the electric motor for converting the electric power supplied thereto to the mechanical power and outputting the mechanical power and the function as the generator for converting the mechanical power input thereto to the electric power, the motor according to the present invention is not limited thereto. It is sufficient that the motor as the prime mover can output the mechanical power from the rotor to the input shaft of the speed change mechanism and may be composed of an electric motor having only a function for converting, for example, the electric power supplied thereto to the mechanical power and outputting the mechanical power.

Note that, in the embodiment, although the rotor 52 of the motor 50 is coupled with the second input shaft 28 of the second speed change mechanism 40, the aspect of the driving apparatus 10 of the present invention is not limited thereto. It is sufficient that the second input shaft is engaged with the rotor of the motor, and a speed reduction mechanism may be disposed between, for example, the second input shaft and the rotor to reduce the rotation speed of the rotor and to input the rotation of the rotor to the second input shaft.

In the embodiment, although the first speed change mechanism 30 transmits the mechanical power received by the first input shaft 27 from the first output shaft 37 to the power integration gear 58 engaged with the drive wheels 88 and the second speed change mechanism 40 transmits the mechanical power received by the second input shaft 28 from the second output shaft 48 to the power integration gear 58, the aspects of the first speed change mechanism 30 and the second speed change mechanism 40 are not limited thereto. It is sufficient that the first speed change mechanism 30 and the second speed change mechanism 40 can transmit the mechanical power received by the input shafts 27, 28, respectively to the drive wheels 88, and, for example, the first speed change mechanism 30 and the second speed change mechanism 40 may transmit the mechanical power received by the first input shaft 27 and the second input shaft 28, respectively to a common output shaft engaged with the drive wheels 88.

Further, in the embodiment, the vehicle driving apparatus 10 changes the speed of the mechanical power from the engine output shaft 8 of the internal combustion engine 5 and the rotor 52 of the motor 50 by at least one of the first speed change mechanism 30 and the second speed change mechanism 40 and transmits the mechanical power from the power integration gear 58 to the drive wheels 88 through the vehicle propeller shaft 66 and the differential mechanism 74 of the final speed reduction device 70, the aspect of the power transmission from the first speed change mechanism 30 and the second speed change mechanism 40 to the drive wheels 88 is not limited thereto. In the driving apparatus 10, it is sufficient that the first speed change mechanism 30 and the second speed change mechanism 40 can transmit the mechanical power received by the first input shaft 27 and the second input shaft 28, respectively, to the drive wheels 88, and, for example, the power integration gear 58 or the first and second drive gears 37c, 48c meshed with the power integration gear 58 may directly drive the ring gear 72 of the differential mechanism 74.

Industrial Applicability

As described above, the present invention is useful to a hybrid vehicle including an internal combustion engine and a motor as prime movers and a dual-clutch transmission, and in particular useful to a hybrid vehicle in which a rotor of a motor is engaged with an input shaft of one of two speed change mechanisms.

EXPLANATION OF LETTERS OR NUMERALS 1 hybrid vehicle
5 internal combustion engine
8 engine output shaft
10 driving apparatus (vehicle driving apparatus)
20 dual-clutch mechanism
21 first clutch
22 second clutch
27 first input shaft
28 second input shaft
30 first speed change mechanism
31, 33, 35, 39 gear stage (speed change stage, gear pair)
37 first output shaft
40 second speed change mechanism
42, 44, 46 gear stage (speed change stage, gear pair)
48 second output shaft
50 motor (motor generator)
52 rotor of motor
58 power integration gear
66 vehicle propeller shaft
70 final speed reduction device
80 drive shaft
88 drive wheel
100 electronic control unit (ECU, controller) of vehicle driving apparatus

The invention claimed is:

1. A vehicle driving apparatus of a vehicle, including an internal combustion engine and a motor as prime movers, that changes a speed of a mechanical power output from an engine output shaft of the internal combustion engine, changes a rotor of the motor by a speed change mechanism, and transmits the mechanical power to drive wheels, the apparatus comprising:
a first speed change mechanism capable of receiving the mechanical power from the engine output shaft by a first input shaft, changing the speed of the mechanical power by any one of a plurality of speed change stages, and transmitting the mechanical power to the drive wheels;
a second speed change mechanism capable of receiving the mechanical power from the engine output shaft and the rotor by a second input shaft engaged with the rotor, changing the speed of the mechanical power by any one of the plurality of speed change stages, and transmitting the mechanical power to the drive wheels;
a first clutch capable of engaging the engine output shaft with the first input shaft; and
a second clutch capable of engaging the engine output shaft with the second input shaft, wherein
the first clutch is placed in a disengaged state when an operation force for executing an engaging/disengaging operation is not applied to the first clutch, and
the second clutch is placed in an engaged state when operation force for executing the engaging/disengaging operation is not applied to the second clutch.

2. The vehicle driving apparatus according to claim 1, further comprising a controller capable of controlling a selection of a speed change stage in the second speed change mechanism and powering of the motor, wherein
the controller causes the motor to execute powering by placing the speed change stages in the second speed change mechanism in a state that any of the speed change stages is not selected, when cranking of the internal combustion engine is executed while the vehicle stops.

3. The vehicle driving apparatus according to claim 1, further comprising a controller capable of controlling a selection of a speed change stage in the first and second speed change mechanisms, the engaging/disengaging state of the first clutch, and powering of the motor, wherein
when the vehicle is started, the controller places the speed change stages in the second speed change mechanism in a state that any of the speed change stages is not selected, causes the motor to execute powering, and places the first clutch in the engaged state.

4. The vehicle driving apparatus according to claim 3, wherein the speed change stages of the first speed change mechanism includes a first speed change stage that is a speed change stage on the lowest speed side, wherein
when the vehicle is started, the controller selects the first speed change stage of the first speed change mechanism.

* * * * *